United States Patent
Chang et al.

(10) Patent No.: US 7,663,721 B2
(45) Date of Patent: Feb. 16, 2010

(54) MULTI-DOMAIN VERTICAL ALIGNMENT LIQUID CRYSTAL DISPLAY PANEL

(75) Inventors: Ting-Jui Chang, Taipei (TW); Po-Lun Chen, Chiayii (TW)

(73) Assignee: Au Optronics Corporation, Hsinchu (TW)

( * ) Notice: Subject to any disclaimer, the term of this patent is extended or adjusted under 35 U.S.C. 154(b) by 433 days.

(21) Appl. No.: 11/102,507

(22) Filed: Apr. 8, 2005

(65) Prior Publication Data

US 2006/0109405 A1    May 25, 2006

(30) Foreign Application Priority Data

Nov. 19, 2004    (TW) ............................... 93135546 A (51) Int. Cl.
*G02F 1/1337* (2006.01)
*G02F 1/1335* (2006.01)

(52) U.S. Cl. ...................................... 349/129; 349/117

(58) Field of Classification Search ................. 349/117, 349/129
See application file for complete search history.

(56) References Cited

U.S. PATENT DOCUMENTS 6,128,058 A * 10/2000 Walton ........................ 349/129
6,812,986 B2 * 11/2004 Takatori et al. ............. 349/141
2004/0207794 A1 * 10/2004 Miyachi et al. ............. 349/143
2006/0193999 A1 * 8/2006 Verall et al. .................. 428/1.1

* cited by examiner

*Primary Examiner*—David Nelms
*Assistant Examiner*—Nathanael R Briggs
(74) *Attorney, Agent, or Firm*—J.C. Patents (57) ABSTRACT

A multi-domain vertical alignment liquid crystal display panel comprising a first substrate, a second substrate, a liquid crystal layer and a plurality of phase-compensating protrusions is provided. The second substrate is configured above the first substrate. The liquid crystal layer is formed between first substrate and the second substrate. The phase-compensating domain regulating protrusions are formed on at least one of the first substrate and the second substrate. The phase-compensating domain regulating protrusions have a plurality of anisotropic birefringence molecules. The slow-axes of the anisotropic birefringence molecules are in a different direction from the slow-axes of the liquid crystal molecules near the phase-compensating protrusions. Therefore, the plurality of anisotropic birefringence molecules can compensate for the phase retardation here, thereby improving the light leakage in the dark state.

20 Claims, 11 Drawing Sheets

FIG. 13

MULTI-DOMAIN VERTICAL ALIGNMENT LIQUID CRYSTAL DISPLAY PANEL

CROSS-REFERENCE TO RELATED APPLICATION

This application claims the priority benefit of Taiwan application serial no. 93135546, filed on Nov. 19, 2004. All disclosure of the Taiwan application is incorporated herein by reference.

BACKGROUND OF THE INVENTION

1. Field of the Invention

The present invention relates to a display device. More particularly, the present invention relates to a multi-domain vertical alignment (MVA) liquid crystal display panel.

2. Description of the Related Art

With the concept of environmental protection on the rise in recent years, display devices having high picture quality, high spatial utilization, low power consumption and radiation-free operation are in great demand. Hence, thin film transistor liquid crystal displays (TFT LCD), which have all the aforementioned advantages, have become one of the mainstream products in the market.

At present, some of the additional features for a liquid crystal display include high contrast ratio, no gray scale inversion, little color shift, high luminance, rich colors, high color saturation level, rapid response and wide viewing angle. Currently, the displays capable of meeting the demand for a wide viewing angle include a twisted nematic (TN) liquid crystal display added with a wide viewing film, an in-plane switching (IPS) liquid crystal display, a fringe field switching liquid crystal display and a multi-domain vertical alignment (MVA) liquid crystal display. Here, a conventional multi-domain vertical alignment liquid crystal display is used as an illustration.

Figure 1:
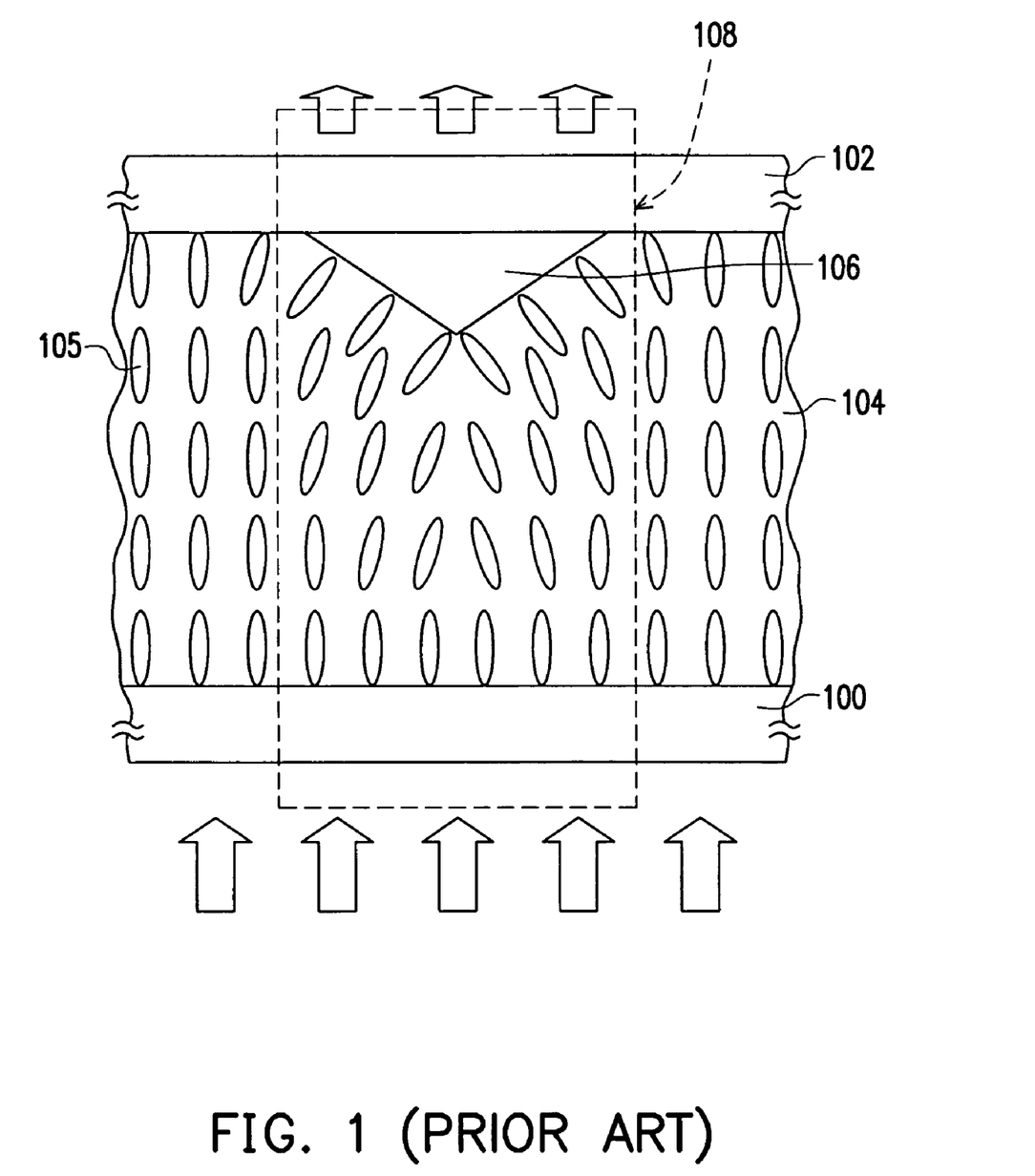
FIG. 1 is a schematic cross-sectional view of a conventional multi-domain vertical alignment (MVA) liquid crystal display panel.

FIG. 1 is a schematic cross-sectional view of a conventional multi-domain vertical alignment (MVA) liquid crystal display panel. As shown in FIG. 1, the MVA liquid crystal display panel mainly comprises a color filter substrate 102, a thin film transistor array substrate 100, a liquid crystal layer 104 and a domain regulating protrusion 106. The domain regulating protrusion 106 activates the liquid crystal molecules 105 to align in multiple directions. The domain regulating protrusion 106 can be disposed on the color filter substrate 102 or the thin film transistor array 100 or disposed on both.

In the conventional multi-domain vertical alignment (MVA) liquid crystal display, the slow-axes direction (the long axes direction of the liquid crystal molecules 105) of the liquid crystal molecules 105 are perpendicular to the thin film transistor array substrate 100 and the color filter substrate 102 when the display screen is in a dark state as shown in FIG. 1. Furthermore, in the presence of a polarizing plates (not shown), the picture on the display can have an optimal dark state to produce high contrast effect. However, the liquid crystal molecules 105 near the domain regulating protrusion 106 are in a tilted state corresponding to the surface contour of the domain regulating protrusion 106. This often leads to light leakage in an area (the area 108 in FIG. 1) close to the domain regulating protrusion 106 and results in a drop of contrast in the display panel.

SUMMARY OF THE INVENTION

Accordingly, at least one objective of the present invention is to provide a multi-domain vertical alignment liquid crystal display panel capable of reducing light leakage in a dark state and improving contrast on a display panel.

To achieve these and other advantages and in accordance with the purpose of the invention, as embodied and broadly described herein, the invention provides a multi-domain vertical alignment (MVA) liquid crystal display panel. The MVA liquid crystal display panel mainly comprises a first substrate, a second substrate, a liquid crystal layer and a plurality of phase-compensating domain regulating protrusions. The second substrate is configured above the first substrate. The liquid crystal layer is disposed between the first substrate and the second substrate. The liquid crystal layer comprises a plurality of liquid crystal molecules. Each phase-compensating domain regulating protrusion comprises a plurality of anisotropic birefringence molecules. The phase-compensation domain regulating protrusions are disposed on at least one of the first substrate and the second substrate.

In one embodiment of the present invention, the slow-axes direction of the liquid crystal molecules near the phase-compensating domain regulating protrusions are different from the corresponding slow-axes direction of the anisotropic birefringence molecules. In one embodiment, the slow-axes of the liquid crystal molecules near the phase-compensating domain regulating protrusions are substantially perpendicular to the slow-axes of the anisotropic birefringence molecules.

The present invention also provides an alternative multi-domain vertical alignment (MVA) liquid crystal display panel. The MVA liquid crystal display panel mainly comprises a first substrate, a second substrate, a liquid crystal layer, a plurality of domain regulating protrusions and a phase-compensating film. The second substrate is configured above the first substrate. The liquid crystal layer is disposed between the first substrate and the second substrate. The liquid crystal layer comprises a plurality of liquid crystal molecules. The domain regulating protrusions are disposed on at least one of the first substrate and the second substrate. The phase-compensating film is disposed on each domain regulating protrusion. The phase-compensating film comprises a plurality of anisotropic birefringence molecules.

In one embodiment of the present invention, the slow-axes direction of the liquid crystal molecules near the domain regulating protrusions are different from the corresponding slow-axes direction of the anisotropic birefringence molecules in the phase-compensating film on the domain regulating protrusions. In one embodiment, the slow-axes of the liquid crystal molecules near the domain regulating protrusions are substantially perpendicular to the slow-axes of the anisotropic birefringence molecules in the phase-compensating film on the domain regulating protrusions.

According to the embodiment of the present invention, the first substrate is a thin film transistor array substrate and the second substrate is a color filter array substrate, for example. In another embodiment, the first substrate is a color filter on array (COA) substrate and the second substrate comprises a substrate and a common electrode thereon, for example.

According to the embodiment of the present invention, the phase-compensating domain regulating protrusions and the phase-compensating film are fabricated using a high polymer, preferably mesogen.

According to the embodiment of the present invention, the phase-compensating protrusions and the phase-compensating film are fabricated using cylindrical anisotropic birefringence molecules. The slow-axes of these cylindrical anisotropic birefringence molecules are parallel to the extending direction of the domain regulating protrusions.

According to the embodiment of the present invention, the phase-compensating domain regulating protrusion and the phase-compensating film are fabricated using disc-shaped anisotropic birefringence molecules, for example. In the present embodiment, the slow-axes of a portion of the anisotropic birefringence molecules on the surface of the protrusions are parallel to the surface of the corresponding protrusions.

In the present invention, an anisotropic material film with birefringence property is disposed on the domain regulating protrusions of a conventional multi-domain vertical alignment (MVA) liquid crystal display panel or an anisotropic material with birefringence property is directly used to fabricate the domain regulating protrusions. Furthermore, the slow-axes of the material are set in a direction different from the slow-axes of the liquid crystal molecules near the material so that the domain regulating protrusions can perform optical compensation on the liquid crystal molecules close to the domain regulating protrusions to reduce light leakage. Ultimately, the contrast of the picture displayed on the MVA liquid crystal display panel is increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

The present invention mainly utilizes a material having an anisotropic birefringence property to provide optical compensation of liquid crystal molecules near the domain regulating protrusions, thereby reducing the phase retardation after the passage of light through the liquid crystal molecules so that light leakage in a display panel can be minimized. In the following, embodiments are used to describe various aspects of the invention. However, they should by no means limit the scope of the present invention as such because anyone familiar with the art could easily modify any one of the following embodiments within the spirit of the present invention.

Figure 2:
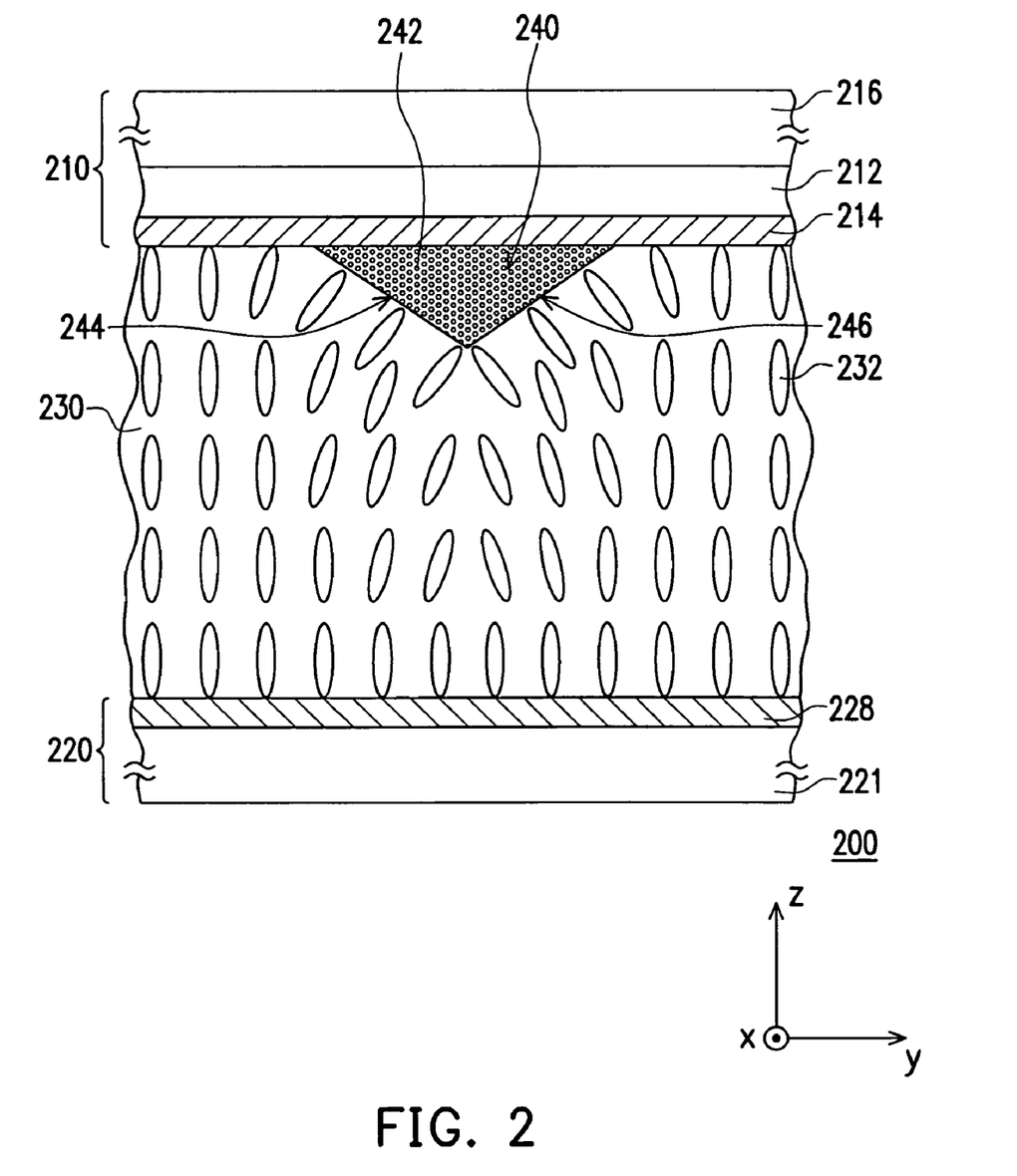
FIG. 2 is a schematic cross-sectional view of a single pixel structure of a multi-domain vertical alignment (MVA) liquid crystal display panel according to one embodiment of the present invention.
Figure 3:
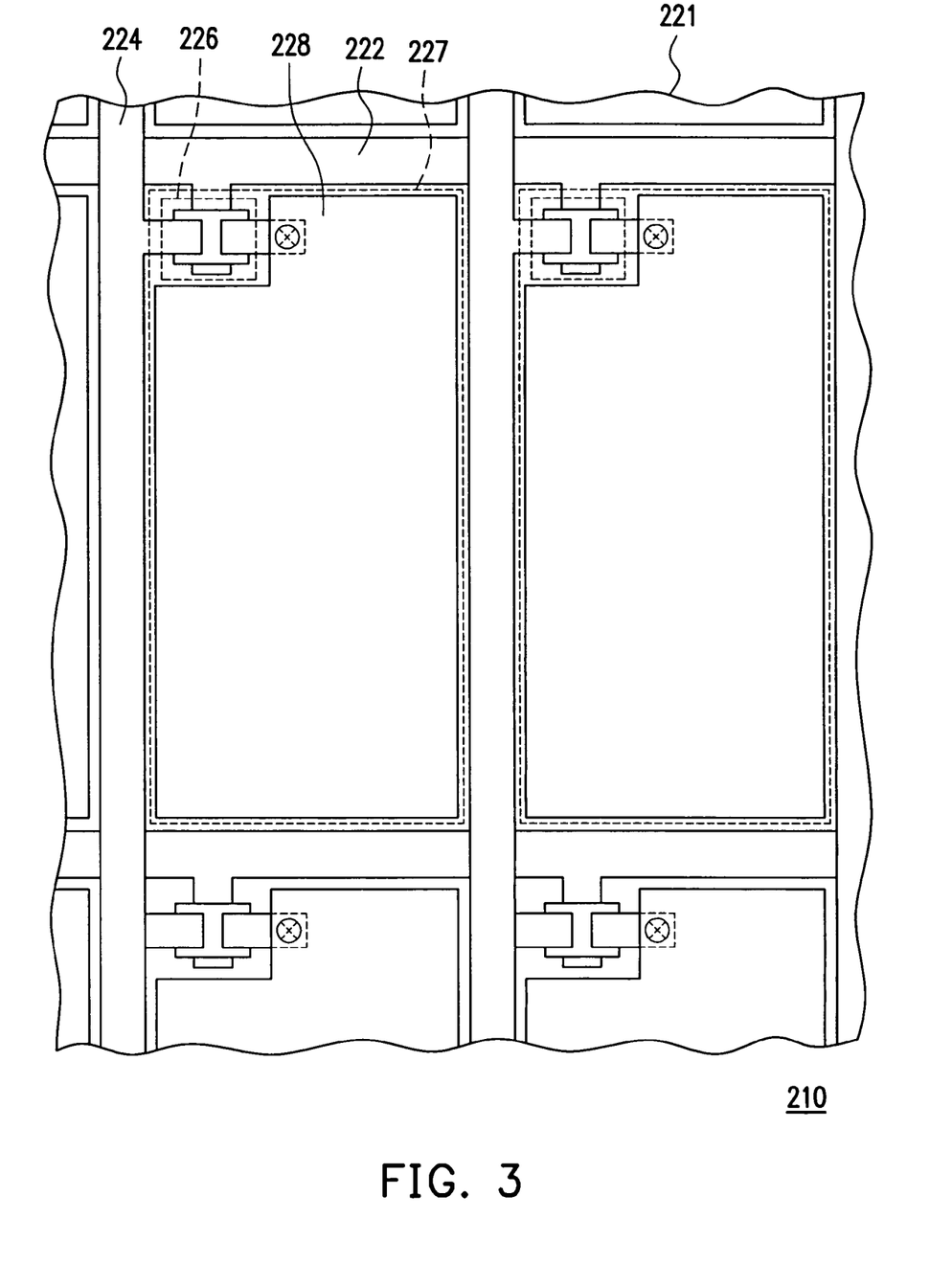
FIG. 3 is a top view of the first substrate 220 in FIG. 2.

FIG. 2 is a schematic cross-sectional view of a single pixel structure of a multi-domain vertical alignment (MVA) liquid crystal display panel according to one embodiment of the present invention. FIG. 3 is a top view of the first substrate 220 in FIG. 2. As shown in FIGS. 2 and 3, the multi-domain vertical alignment (MVA) liquid crystal display panel 200 mainly comprises a first substrate 220, a second substrate 210, a liquid crystal layer 230 and a plurality of phase-compensating domain regulating protrusions 240 (only one is shown in FIG. 2). The first substrate 220 is a thin film transistor array substrate comprising a plurality of scan lines 222, a plurality of data lines 224, a plurality of thin film transistors 226 and a plurality of pixel electrodes 228, for example. As shown in FIG. 3, the areas enclosed by the scan lines 222 and the data lines 224 on the substrate 221 are the pixel areas 227. The thin film transistors 226 are disposed in the pixel areas 227, and are driven by the signals transmitted from a corresponding scan lines 222 and data lines 224. The pixel electrodes 228 are disposed within the respective pixel areas 227 and electrically connected to corresponding thin film transistors 226.

The second substrate 210 is configured above the first substrate 220. The second substrate 210 is a color filter array substrate comprising a substrate material 216, a plurality of color-filtering films 212 (only one color-filtering film 212 is shown in FIG. 2) and a common electrode 214 covering the color-filtering film 212. Furthermore, each color-filtering film 212 corresponds to a pixel electrode 228 on the first substrate 220. The liquid crystal layer 230 is disposed between the first substrate 220 and the second substrate 210 and comprises a plurality of liquid crystal molecules 232.

Figure 4:
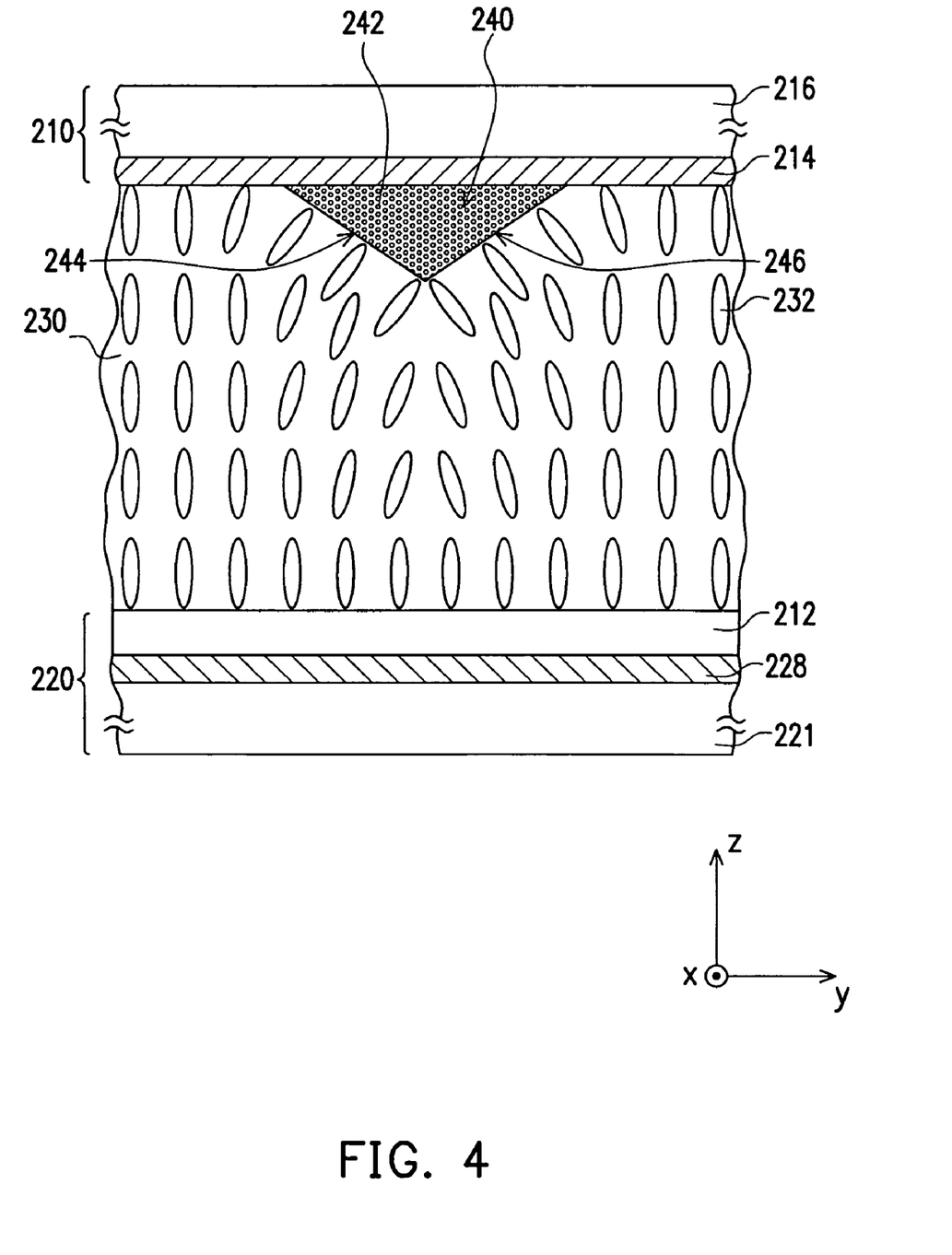
FIG. 4 is a schematic cross-sectional view of a single pixel structure of a multi-domain vertical alignment (MVA) liquid crystal display panel according to another embodiment of the present invention.

It should be noted that the first substrate 220 could be a color filter on array (COA) substrate in another embodiment of the present invention. In other words, the first substrate 220 is a substrate comprising a color-filtering film 212 and a thin film transistor array. In addition, the second substrate 210 is a substrate comprising a substrate material 216 and a common electrode 214 thereon as shown in FIG. 4, for example. In other words, the location of the color-filtering film 212 in the MVA liquid crystal display panel is not restricted in the present invention.

The phase-compensating domain regulating protrusions 240 comprise a plurality of anisotropic birefringence molecules 242, for example. The anisotropic birefringence molecules 242 are high polymers, preferably mesogen. In the present embodiment, the phase-compensating domain regulating protrusions 240 are disposed on the second substrate 210, for example.

In addition, the phase-compensating domain regulating protrusions 240 can be in the shape of linear stripes disposed on the second substrate 210. Moreover, the linear phase-compensating domain regulating protrusions 240 can have a curved surface or a surface comprising two slant surfaces. In other words, the phase-compensating domain regulating protrusions 240 can have a triangular (as shown in FIG. 5), a semi-circular or a semi-elliptical cross-sectional profile.

Figure 5:
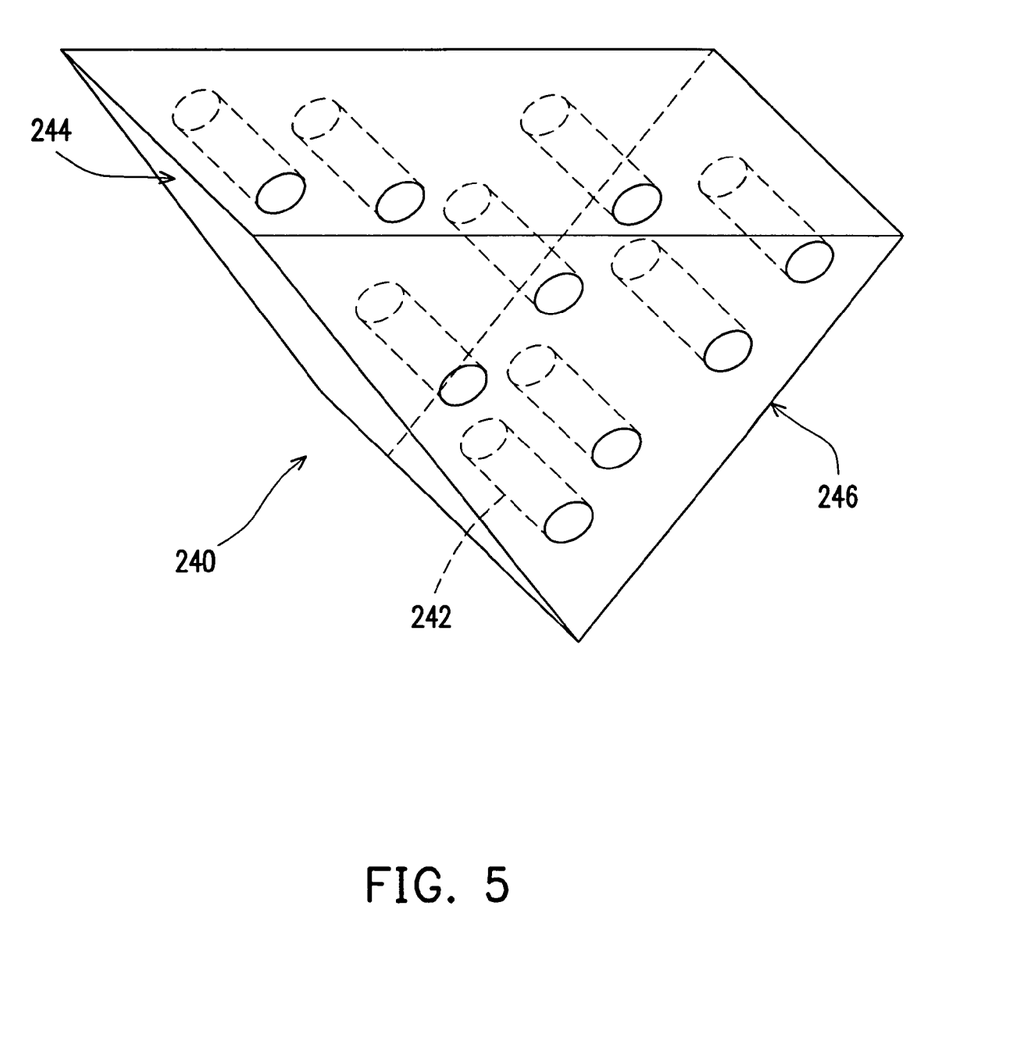
FIG. 5 is a transparent perspective view of a phase-compensating domain regulating protrusion 240 in FIG. 4.

FIG. 5 is a transparent perspective view of a phase-compensating domain regulating protrusion 240 in FIG. 4. Using a triangular phase-compensating domain regulating protrusion as shown in FIG. 5 as an example, the phase-compensating domain regulating protrusion 240 has a surface comprising a first slant surface 244 and a second slant surface 246. The second slant surface 246 is connected to the first slant surface 244. Furthermore, the second slant surface 246 has a slant direction different from the first slant surface 244. In particular, the anisotropic birefringence molecules 242 inside the phase-compensating domain regulating protrusions 240 have a cylindrical shape. Moreover, the slow-axes of the anisotropic birefringence molecules 242 are parallel to the extending direction of the linear phase-compensating domain regulating protrusions 240 as shown in FIG. 5, for example.

In finer detail, the extending direction of the phase-compensating domain regulating protrusions 240 is parallel to the x-axis as shown in FIG. 2. Therefore, the slow-axes of the anisotropic birefringence molecules 242 are parallel to the x-axis and the slow-axes of the liquid crystal molecules 232 near the phase-compensating protrusions alignment 240 are parallel to the y-z plane. In other words, the slow-axes of the liquid crystal molecules 232 (the long axes of the liquid crystal molecules 232) in the vicinity of the phase-compensating domain regulating protrusions 240 are in different direction from the slow-axes of the anisotropic birefringence molecules 242. Preferably, they are perpendicular to each other. Hence, in the dark state, when the liquid crystal molecules 232 in the vicinity of the phase-compensating domain regulating protrusions 240 tilt in a particular direction to cause some retardation to the passing light, the anisotropic birefringence molecules 242 inside the phase-compensating domain regulating protrusions 240 can compensate (or offset) a portion of the phase retardation. Ultimately, light leakage in the dark state from the MVA liquid crystal display panel 200 will be significantly improved and the contrast of the display screen will be increased.

It should be noted that there is no particular restriction to the shape of the phase-compensating protrusions in the present invention. In other embodiments, the protrusions are in different shapes. In the following, a hemispherical phase-compensating protrusion is used as an example.

Figure 6:
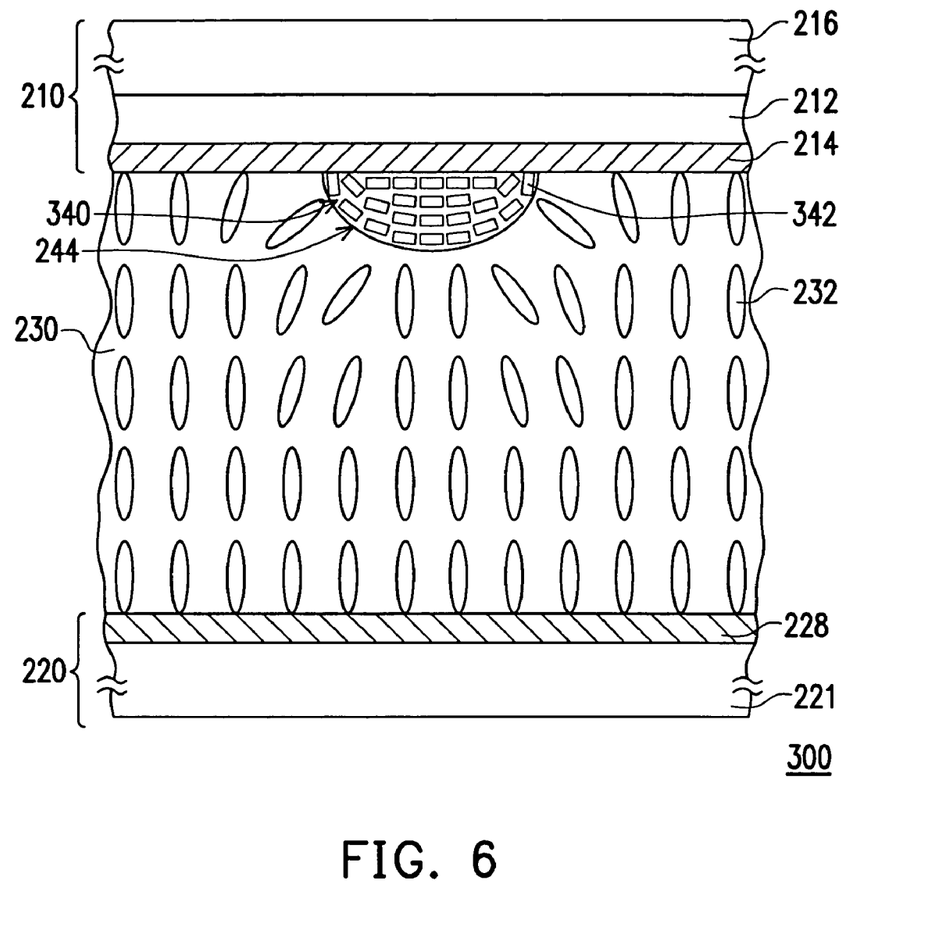
FIG. 6 is a schematic cross-sectional view of a multi-domain vertical alignment (MVA) liquid crystal display panel according to another embodiment of the present invention.

FIG. 6 is a schematic cross-sectional view of a multi-domain vertical alignment (MVA) liquid crystal display panel according to another embodiment of the present invention. As shown in FIG. 6, the MVA liquid crystal display panel 300 has a structure similar to that of the aforementioned MVA liquid crystal display panel 200 in the aforementioned embodiment. Since the major difference is in the phase-compensating protrusions, detailed description of other components is not repeated herein.

Figure 7:
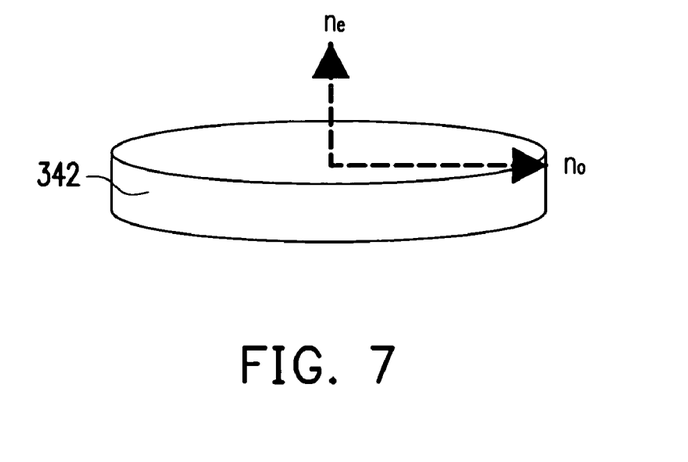
FIG. 7 is a perspective view showing the structure of an anisotropic birefringence molecule 342 inside the phase-compensating domain regulating protrusion 340 in FIG. 6.

In the present embodiment, the phase-compensating domain regulating protrusions 340 are of a hemispherical shape and the anisotropic birefringence molecules 342 inside the phase-compensating domain regulating protrusions 340 are of a disc shape. FIG. 7 is a perspective view showing the structure of an anisotropic birefringence molecule 342 inside the phase-compensating domain regulating protrusion 340 in FIG. 6. It should be noted that the refractive index along the optical axes of the anisotropic birefringence molecules 342 are $n_e$ (the extraordinary refractive index), the refractive index perpendicular to the optical axes are $n_o$ (the ordinary refractive index) and $n_e < n_o$. In other words, the slow-axes of the disc-shape anisotropic birefringence molecules 342 are perpendicular to its optical axes.

As shown in FIG. 6, the slow-axes of the anisotropic birefringence molecules 342 on the surface of the phase-compensating protrusions 340 are parallel to the surface of the corresponding phase-compensating domain regulating protrusions 340. Hence, in the dark state, a portion of the phase retardation due to the passage of light through the liquid crystal molecules 232 in the vicinity of the phase-compensating domain regulating protrusions 340 will be offset by the anisotropic birefringence molecules 342. In other words, the phase-compensating protrusions 340 constructed using anisotropic birefringence molecules 342 are quite effective in reducing the light leakage in the dark state and increasing the contrast in a display panel.

Figure 8:
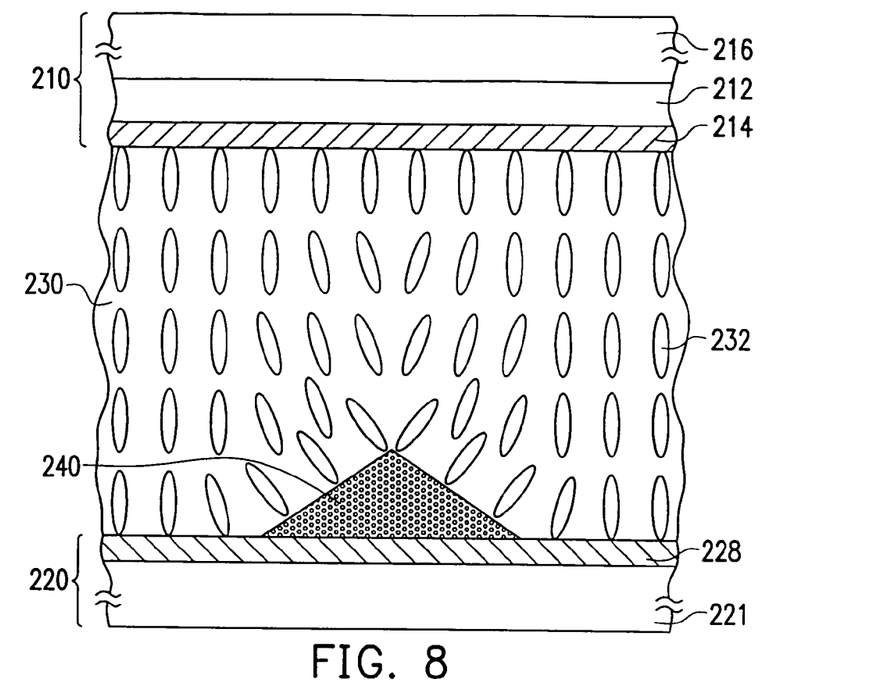
FIGS. 8 through 13 are schematic cross-sectional views of multi-domain vertical alignment (MVA) liquid crystal display panels according to other embodiments of the present invention.
Figure 9:
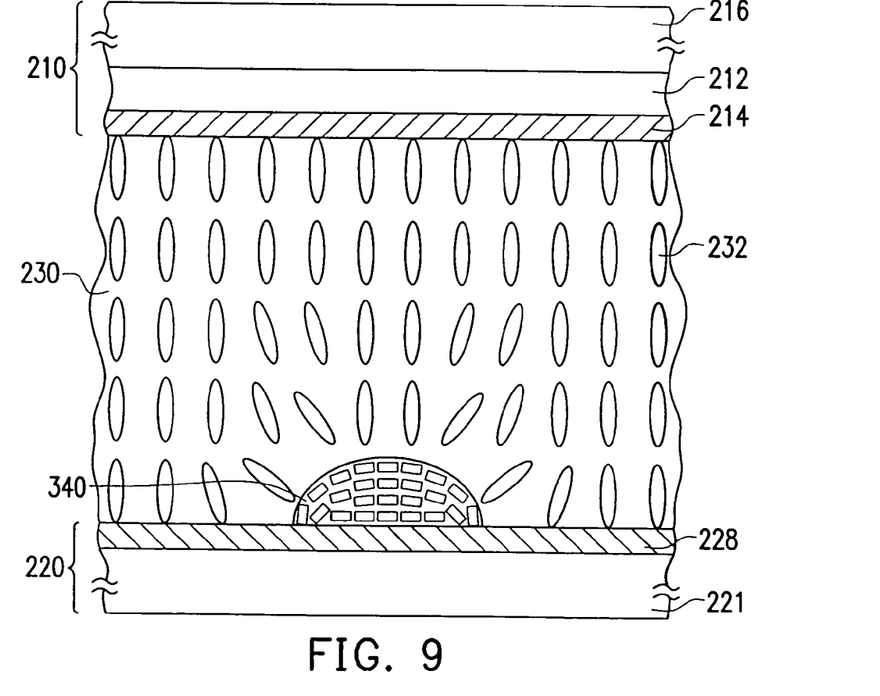
Figure 10:
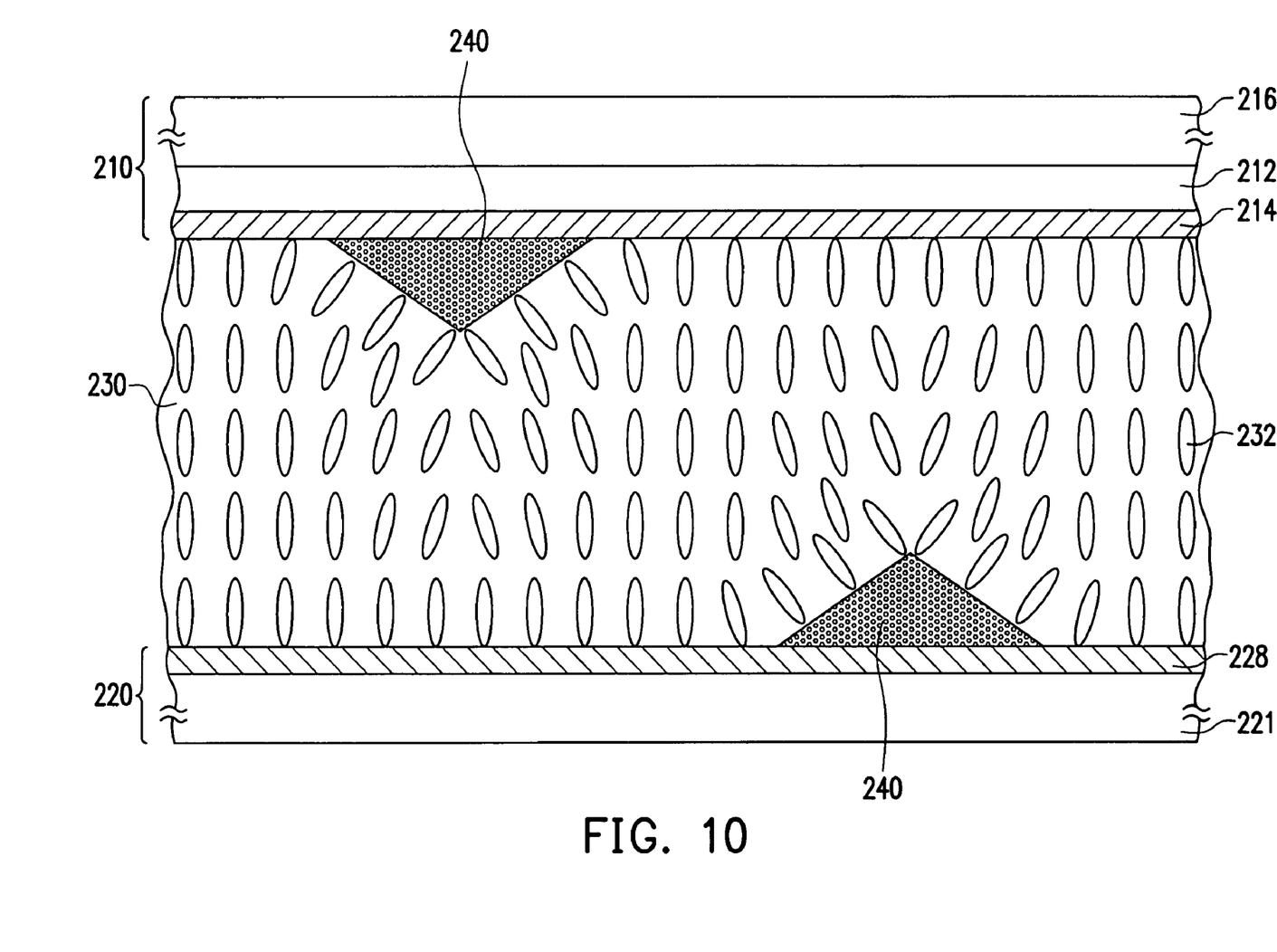
Figure 11:
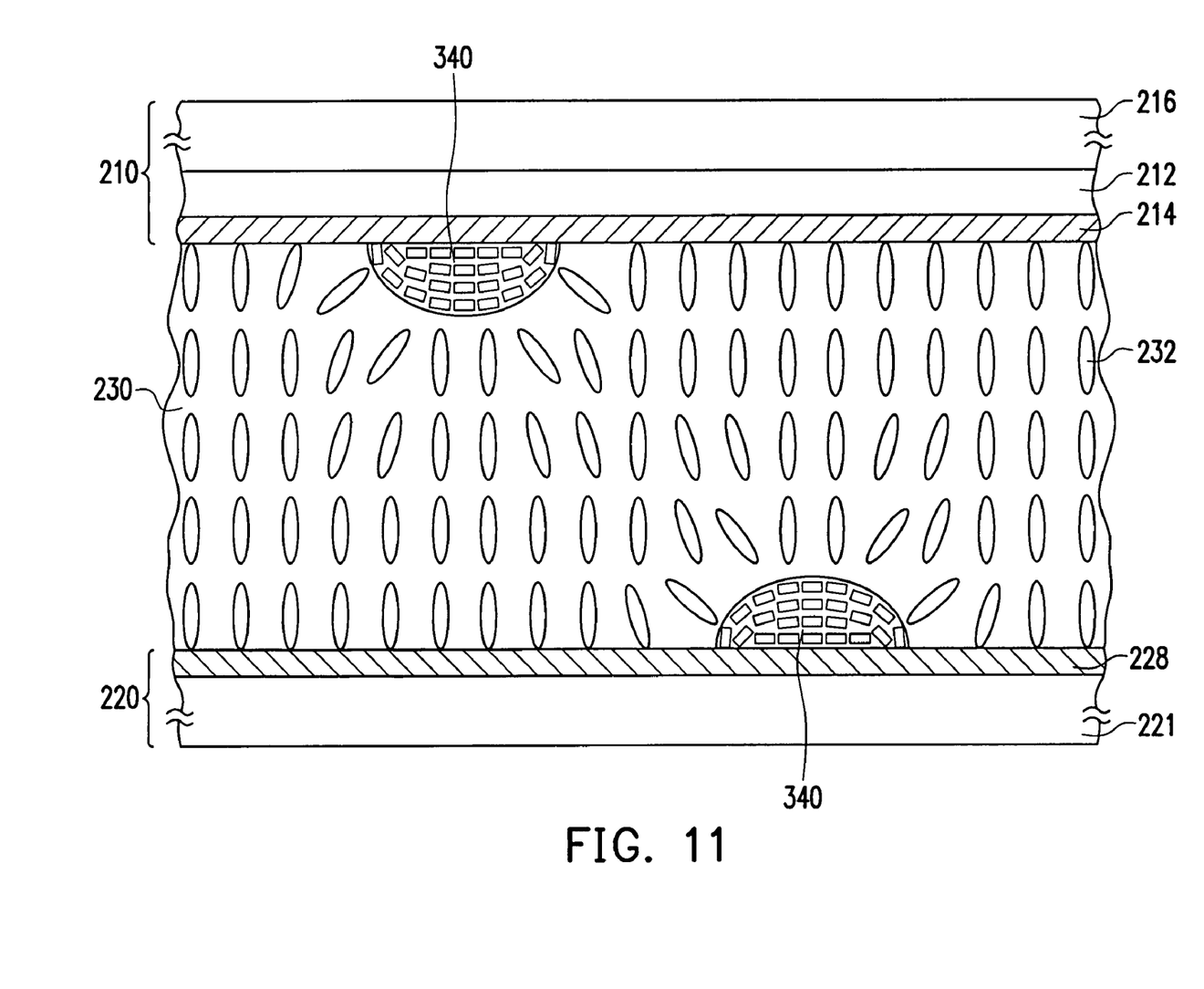

In addition, anyone familiar with the skill of fabricating a MVA liquid crystal display panel may notice that the phase-compensating domain regulating protrusions in the two aforementioned embodiments can be disposed on the second substrate 210 (as shown in FIGS. 2 and 6), or disposed on the first substrate 220 (on the pixel electrode 228 as shown in FIGS. 8 and 9), or simultaneously disposed on the second substrate 210 and the first substrate 220 (as shown in FIGS. 10 and 11). Furthermore, if phase-compensating domain regulating protrusions are disposed on the second substrate 210 and the first substrate 220 simultaneously, the shape of the phase-compensating domain regulating protrusions on the second substrate 210 and those on the first substrate 220 can be identical or can be different. In the present invention, the shape and location of the phase-compensating domain regulating protrusions are not limited. Yet, no matter the phase-compensating domain regulating protrusions are disposed on the first substrate 220, the second substrate 210 or both, the phase-compensating domain regulating protrusions are generally disposed inside a corresponding pixel area. Thus, anyone familiar with the art may select suitable locations to dispose the phase-compensating domain regulating protrusions according to the actual manufacturing process.

In another embodiment of the present invention, a layer of phase-compensating film can be disposed over a conventional MVA liquid crystal display panel to achieve an effect identical to the aforementioned embodiments. In the following, embodiments are given in detail.

Figure 12:
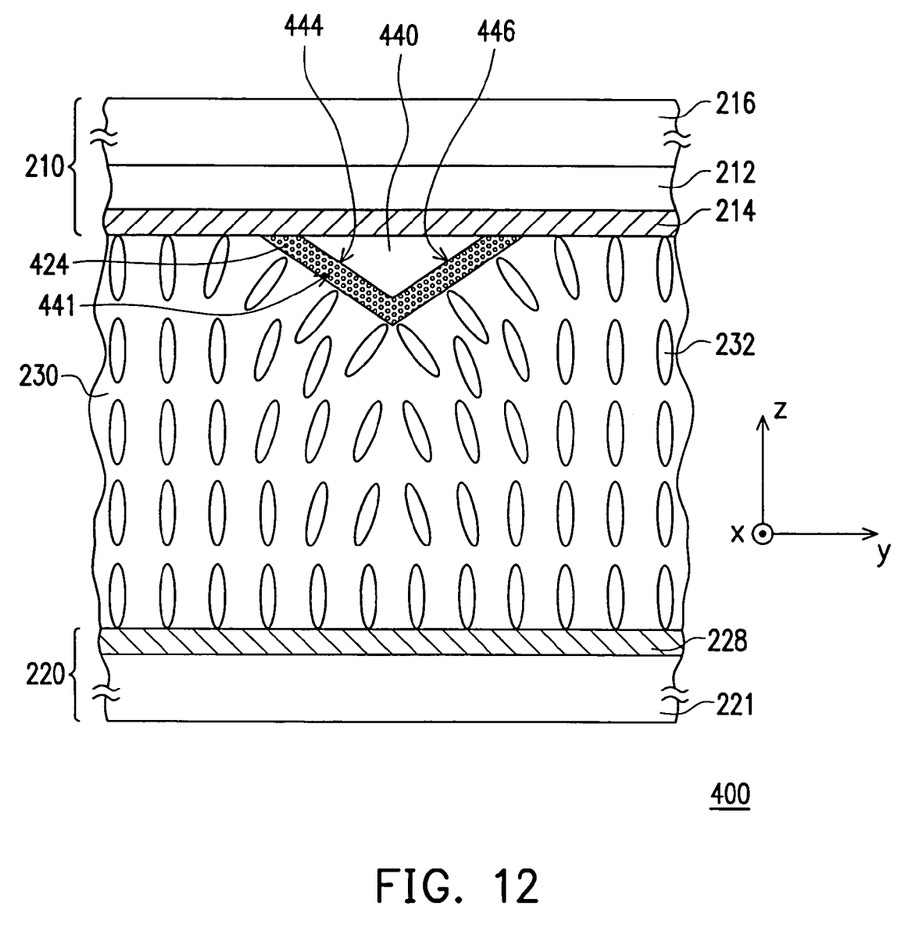

FIG. 12 is a schematic cross-sectional view of multi-domain vertical alignment (MVA) liquid crystal display panel according to yet another embodiment of the present invention. It should be noted that the main difference between the MVA liquid crystal display panel 400 in FIG. 12 and the MVA liquid crystal display panel 200 in FIG. 2 is in the domain regulating protrusions. Hence, in the following, detailed description of other components of the MVA liquid crystal display panel 400 is omitted.

As shown in FIG. 12, the MVA liquid crystal display panel 400 mainly comprises a second substrate 210, a first substrate 220, a liquid crystal layer 230, a domain regulating protrusion 440 and a phase-compensating film 441. The second substrate 210 is configured above the first substrate 220. The liquid crystal layer 230 is disposed between the first substrate 220 and the second substrate 210. The liquid crystal layer 230 comprises a plurality of liquid crystal molecules 232. It should be noted that the domain regulating protrusions 440 could be disposed on the second substrate 210, the first substrate 220 or on the second substrate 210 and the first substrate 220 simultaneously. In FIG. 12, the domain regulating protrusion 440 disposed on the second substrate 210 is described in the following as an example.

The phase-compensating film 441 is disposed on the domain regulating protrusion 440. The phase-compensating film 441 is fabricated using a high polymer, preferably mesogen. The phase-compensating film 441 comprises a plurality of anisotropic birefringence molecules 424. In the present embodiment, the domain regulating protrusion 440 is a linear stripe of protruding material having a first slant surface 444 and a second slant surface 446, for example. Furthermore, the phase-compensating film 441 is disposed on the first slant surface 444 and the second slant surface 446 of the domain regulating protrusion 440. Similar to the aforementioned embodiments, the domain regulating protrusions 440 in the present embodiment can be linear protrusions having a curved surface. In addition, the anisotropic birefringence molecules 424 constituting the phase-compensating film 441 can be cylindrical anisotropic birefringence molecules as shown in FIG. 5. In other words, the slow-axes of the anisotropic birefringence molecules 424 in the present embodiment are parallel to the x-axis direction so that a portion of the phase retardation of light passing near the domain regulating protrusion 440 is compensated and the amount of light leakage in this area is improved.

Figure 13:
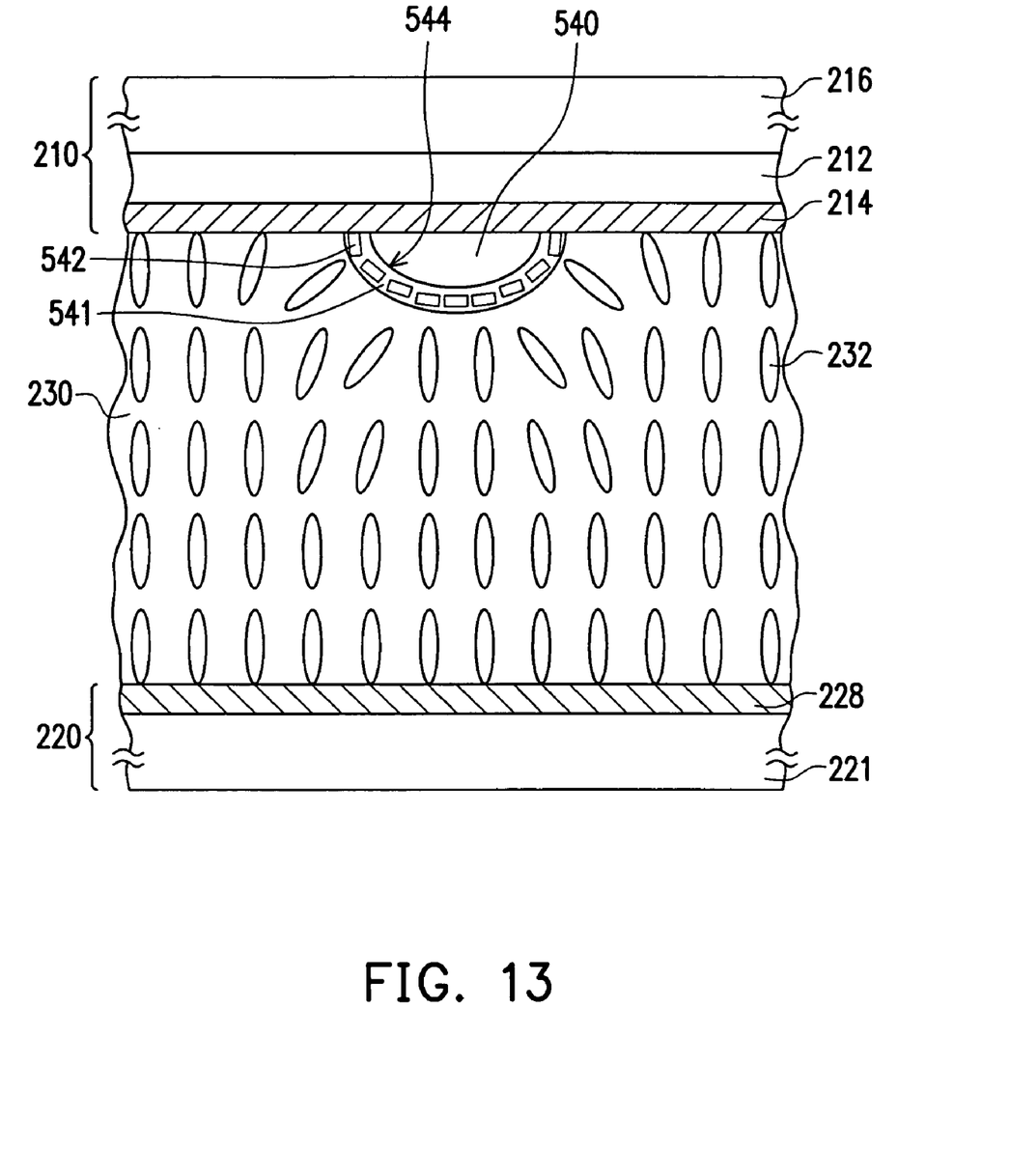

As shown in FIG. 13, according to another embodiment, the phase-compensating film 541 can be disposed on the hemispherical domain regulating protrusion 540. In the present embodiment, the anisotropic birefringence molecules 542 within the phase-compensating film 541 are disc-shaped anisotropic birefringence molecules shown in FIG. 7. In other words, the slow-axes of the anisotropic birefringence molecules 542 are parallel to the corresponding surface 544 of the domain regulating protrusion 540 so that the phase retardation of light passing in the vicinity of the domain regulating protrusion 540 can be compensated. Similarly, the domain regulating protrusion 540 covered with the phase-compensating film 541 can be disposed on the first substrate 220 or simultaneously disposed on the first substrate 220 and the second substrate 210. Since anyone skilled in the art can easily reproduce the aforementioned structures, additional drawings and explanations for the structures are omitted.

In summary, the present invention provides an anisotropic material film with birefringence property disposed on the domain regulating protrusions of a conventional multi-domain vertical alignment (MVA) liquid crystal display panel, or an anisotropic material with birefringence property is directly used to fabricate the domain regulating protrusions. Furthermore, the slow-axes of the anisotropic birefringence molecules are set in a direction different from the slow-axes of the liquid crystal molecules near the anisotropic birefringence material so that the domain regulating protrusions can perform optical compensation on the liquid crystal molecules and reduce the light leakage therein. Ultimately, the contrast of the picture displayed on the MVA liquid crystal display panel is enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-domain vertical alignment (MVA) liquid crystal display panel, comprising:
   a first substrate;
   a second substrate disposed over the first substrate;
   a liquid crystal layer, vertically aligned and disposed between the first substrate and the second substrate, comprising a plurality of liquid crystal molecules; and
   a plurality of phase-compensating domain regulating protrusions disposed on at least one of the first substrate and the second substrate, and each phase-compensating domain regulating protrusion having a plurality of anisotropic birefringence molecules distributed therein, wherein the slow-axes of the liquid crystal molecules in the vicinity of the phase-compensating domain regulating protrusions are perpendicular to an outer surface of the phase-compensating domain regulating protrusions, and the phase-compensating domain regulating protrusions reduce light leakage.

2. The liquid crystal display panel of claim 1, wherein the slow-axes of the anisotropic birefringence molecules in the phase-compensating domain regulating protrusions are oriented in a direction different from the slow-axes of the liquid crystal molecules in the vicinity of the phase-compensating domain regulating protrusions.

3. The liquid crystal display panel of claim 2, wherein the slow-axes of the anisotropic birefringence molecules in the phase-compensation domain regulating protrusions are perpendicular to the slow-axes of the liquid crystal molecules in the vicinity of the phase-compensating domain regulating protrusions.

4. The liquid crystal display panel of claim 1, wherein the phase-compensating domain regulating protrusions are comprised of polymer.

5. The liquid crystal display panel of claim 4, wherein the polymer comprises mesogen.

6. The liquid crystal display panel of claim 1, wherein the anisotropic birefringence molecules have a cylindrical shape and the slow-axes of the cylindrical anisotropic birefringence molecules are parallel to the surface of the phase-compensating domain regulating protrusions.

7. The liquid crystal display panel of claim 1, wherein the anisotropic birefringence molecules have a disc shape.

8. The liquid crystal display panel of claim 7, wherein the slow-axes of a portion of the anisotropic birefringence molecules on the surface of the phase-compensating domain regulating protrusions are parallel to the corresponding surface of the phase-compensating domain regulating protrusions.

9. The liquid crystal display panel of claim 1, wherein the first substrate is a thin film transistor array substrate and the second substrate is a color filter array substrate.

10. The liquid crystal display panel of claim 1, wherein the first substrate is a color filter on array (COA) substrate and the second substrate comprises a common electrode.

11. A multi-domain vertical alignment (MVA) liquid crystal display panel, comprising:
    a first substrate;
    a second substrate disposed above the first substrate;
    a liquid crystal layer vertically aligned and disposed between the first substrate and the second substrate, wherein the liquid crystal layer comprises a plurality of liquid crystal molecules;
    a plurality of domain regulating protrusions disposed on at least one of the first substrate and the second substrate; and
    a plurality of phase-compensating patterns, each of the phase-compensating patterns covering the surface of one of the domain regulating protrusions respectively, wherein the phase-compensating patterns comprises a plurality of anisotropic birefringence molecules, wherein the slow-axes of the liquid crystal molecules in the vicinity of the phase-compensating domain regulating protrusions are perpendicular to an outer surface of the phase-compensating domain regulating protrusions, and the phase-compensating domain regulating protrusions reduce light leakage.

12. The liquid crystal display panel of claim 11, wherein the slow axes of the anisotropic birefringence molecules in the phase-compensating film are oriented in a different direction from the direction of the slow-axes of the liquid crystal molecules in the vicinity of the phase-compensating film.

13. The liquid crystal display panel of claim 12, wherein the slow-axes of the anisotropic birefringence molecules in the phase-compensation film are perpendicular to the slow-axes of the liquid crystal molecules in the vicinity of the phase-compensating film.

14. The liquid crystal display panel of claim 11, wherein the phase-compensating film comprises a polymer.

15. The liquid crystal display panel of claim 14, wherein the polymer comprises mesogen.

16. The liquid crystal display panel of claim 11, wherein the anisotropic birefringence molecules have a cylindrical shape, and the slow-axes of the cylindrical anisotropic birefringence molecules is parallel to the surfaces of the domain regulating protrusions.

17. The liquid crystal display panel of claim 11, wherein the anisotropic birefringence molecules have a disc shape.

18. The liquid crystal display panel of claim 17, wherein the slow-axes of a portion of the anisotropic birefringence molecules adjacent to the surface of the domain regulating protrusions are parallel to the corresponding surface of the domain regulating protrusions.

19. The liquid crystal display panel of claim 11, wherein the first substrate is a thin film transistor array substrate and the second substrate is a color filter array substrate.

20. The liquid crystal display panel of claim 11, wherein the first substrate comprises a color filter on away (COA) substrate and the second substrate comprises a common electrode.

* * * * *